United States Patent
Thorpe et al.

(10) Patent No.: US 10,189,523 B2
(45) Date of Patent: Jan. 29, 2019

(54) HANDLEBAR MOUNTABLE LIGHT PIPE APPARATUS FOR A BICYCLE

(71) Applicant: Karbon Kinetics Limited, Surrey (GB)

(72) Inventors: Richard Brian Thorpe, Surrey (GB); Peter Angiolini, Surrey (GB)

(73) Assignee: Karbon Kinetics Limited, Surrey (GB)

( * ) Notice: Subject to any disclaimer, the term of this patent is extended or adjusted under 35 U.S.C. 154(b) by 0 days.

(21) Appl. No.: 15/748,298

(22) PCT Filed: Jul. 27, 2016

(86) PCT No.: PCT/GB2016/000141
§ 371 (c)(1),
(2) Date: Jan. 29, 2018

(87) PCT Pub. No.: WO2017/017396
PCT Pub. Date: Feb. 2, 2017

(65) Prior Publication Data
US 2018/0215429 A1 Aug. 2, 2018

(30) Foreign Application Priority Data
Jul. 29, 2015 (GB) .................................. 1513337.4

(51) Int. Cl.
*B62J 6/02* (2006.01)
*B62K 21/12* (2006.01)
(Continued)

(52) U.S. Cl.
CPC ................. *B62J 6/02* (2013.01); *B62K 21/12* (2013.01); *F21W 2107/13* (2018.01); *F21Y 2103/30* (2016.08); *F21Y 2115/10* (2016.08)

(58) Field of Classification Search
CPC ........ B62J 6/02; B62K 21/12; F21Y 2103/30; F21Y 2115/10; F21W 2107/13
(Continued)

(56) References Cited

U.S. PATENT DOCUMENTS 4,337,503 A 6/1982 Turner
4,875,142 A * 10/1989 Spector .................... B62J 6/005
362/474
(Continued)

FOREIGN PATENT DOCUMENTS

CN 202593695 12/2012
CN 203421654 5/2014
(Continued)

OTHER PUBLICATIONS

International Searching Authority., International Search Report and Written Opinion dated Oct. 26, 2016 for PCT Application No. PCT/GB2016/000141 Filed Jul. 27, 2016, 10 pages.
(Continued)

*Primary Examiner* — Laura Tso
(74) *Attorney, Agent, or Firm* — Brooks, Cameron & Huebsch, PLLC

(57) ABSTRACT

There is described a handlebar mountable bicycle light for fitting to a bicycle handlebar (3) between brake levers (4). The bicycle light comprises an upper cover (5) and a lower cover (6) which are preferably made from injection molded plastics and of a clam shell type arrangement able to receive handlebar (3) and rigidly retain light pipe assembly (7) with cover screws (8). Lower cover (6) contains an aperture (14) through which the handlebar stem (9) extends. The light pipe assembly (7) comprises a transparent rod-like light pipe (18) with LEDs (26) mounted at each end of the light pipe (18). The light pipe assembly 7 further includes heat sinks (24) to draw heat away from the LEDs (26). The arrangement is such that when the bicycle light is mounted to the handlebar, the heat sinks (24) are in contact with the handlebar so that heat from the LEDs may be conducted via the heat sinks (24) to the handlebar material.

9 Claims, 9 Drawing Sheets

(51) Int. Cl.
*F21Y 103/30* (2016.01)
*F21Y 115/10* (2016.01)
*F21W 107/13* (2018.01)

(58) Field of Classification Search
USPC ................................ 362/474, 493, 511, 581
See application file for complete search history.

(56) References Cited

U.S. PATENT DOCUMENTS

| | | | | |
|---|---|---|---|---|
| 4,901,209 | A * | 2/1990 | Nitz | B62J 6/00 |
| | | | | 280/281.1 |
| 5,008,782 | A * | 4/1991 | Murray | B62J 6/00 |
| | | | | 362/249.01 |
| 6,336,736 | B1 * | 1/2002 | Edmond | B62J 6/00 |
| | | | | 362/473 |
| 7,481,560 | B1 * | 1/2009 | Jaw | B62J 6/00 |
| | | | | 16/421 |
| 2003/0223247 | A1 | 12/2003 | Karras | |
| 2006/0092647 | A1 * | 5/2006 | Glasser | B62J 6/20 |
| | | | | 362/473 |
| 2012/0051072 | A1 * | 3/2012 | Yelverton | B62J 6/00 |
| | | | | 362/473 |
| 2012/0195034 | A1 | 8/2012 | Kuo | |
| 2014/0268840 | A1 * | 9/2014 | Smith | B62J 6/00 |
| | | | | 362/473 |
| 2016/0368555 | A1 * | 12/2016 | Peterson | B62J 6/02 |

FOREIGN PATENT DOCUMENTS

| | | |
|---|---|---|
| DE | 10033133 | 1/2002 |
| DE | 102007059571 | 6/2009 |
| EP | 2439132 | 4/2012 |
| EP | 2662270 | 11/2013 |
| JP | 2013151177 | 8/2013 |
| WO | 2014202726 | 12/2014 |

OTHER PUBLICATIONS

UK Search Report dated Jan. 20, 2017 for GB Application No. 1513337.4 Filed Jul. 29, 2015, 4 pages.

* cited by examiner

HANDLEBAR MOUNTABLE LIGHT PIPE APPARATUS FOR A BICYCLE

In the field of bicycles, there exist numerous types of handlebar mounted lights. Typically, handlebar mounted bicycle lights employ a light emitting diode (LED) to generate light. The LED is generally contained in an opaque metal or plastic housing that, when the light is mounted to the bicycle, will shield the rider's eyes from light. The light housing will include a transparent portion in the front to allow light to be emitted generally forward. Some lights have more complex designs that include mirror and lens elements that reflect and focus the light in a specific direction, or give a predetermined intensity distribution, or form an image or pattern. The lens elements can be separate or included in the transparent portion of the light housing and the mirror elements are usually situated rearward and to the sides of the LED in order to reflect and focus the light forward and out through the transparent portion or lens.

Generally, handlebar mounted light designs that have mirror and lens elements that reflect and focus the light are able to illuminate the road ahead so that the rider can see where he or she is going. These are known as "to see" lights. Handlebar mounted light designs that do not have mirror and lens elements to reflect and focus the light do not generally illuminate the road ahead effectively and are known as "to be seen" lights and have the primary purpose of increasing the visibility of the bicycle and rider to other road users.

There is another type of light design which falls into the "to be seen" type of category. This category of light designs is generally referred to as "light pipe" type designs and they are commonly used on modern cars for daytime running lights. Light pipe designs consist of a single or plurality of LED light sources and an elongate generally cylindrical and solid clear plastics rod or light conduit. The device is referred to as a "light pipe" even though it may not be a physical tube, because the light is conducted along the length of the rod, much as a liquid would flow along a pipe. An LED light source is generally situated at one end of the clear plastic pipe. Along one side of the length of the plastic pipe focus and reflecting elements are formed into the surface of the plastics rod. Light from the LED source travels immediately into the light pipe at the end and remains "trapped" in the light pipe as it is reflected internally off the smooth polished surface of the pipe due to the shallow angle of incidence of the light on the internal surface of the light pipe. At the point that light interacts with the focal and reflecting element portion of the light pipe, which can be a series of angled facets protruding into the light pipe, the light will be reflected in the direction of the focal element orientation and escape out through the light pipe due to the high angle of incidence between the light and the internal wall of the light pipe. The effect of the light pipe design is an appearance of a glowing or lighted rod resembling a fluorescent tube.

Designers are able to bend and curve the light pipe, for example to match the aesthetics and features of a vehicle into which the light pipe is incorporated. The ability to vary the shape of the light pipe can aid the manufacturer and designer in offering a distinct visual shape to customers which can enhance the value of the product and brand distinction.

With regard to handlebar mounted light designs for bicycles, these are typically mounted on the handlebars of the bicycle with a round plastic or rubber strap or clamp suited to the standard range of diameters of typical handlebars, which is from 22 mm up to 35 mm.

Generally, the benefits of light pipe type bicycle lights relate to the ability for designers to offer a practical "to be seen" light but with unique and distinctive visual appearance. Another benefit is that the light pipe is by nature long and slender which lends itself to integrating well with the form factor of bicycles—such as along the seat or handlebar or frame tubing. Another benefit of a light pipe style light for a bicycle is that the distinctive and unusual shape or appearance can aid in making the rider and bicycle more noticeable and visible to other road users.

Bicycle light manufacturers are starting to produce bicycle lights incorporating light pipe technology. These designs have thus far been limited to adding a light pipe to an existing rear light design such as encircling the traditional rear square light with a light pipe. Audi produced in 2013 an electric bicycle which employed a light pipe style front light system moulded into a bespoke multi tubular handlebar structure. This integral moulded design was bespoke to the Audi bike prototype and therefore very expensive to produce. The design could not be used in conjunction with a normal and readily available bicycle handlebar and stem design and could not be retrofitted to existing bicycles.

An objective of the present invention is to provide a light pipe that can be seamlessly mounted to a bicycle handlebar and stem in a low cost and aesthetically pleasing way, with the light pipe being positioned roughly parallel with and extending in front of the handlebar. In the case of the Audi bicycle light pipe design, while the design of the light pipe followed the form of the handlebar, the solution was not compatible or mountable to a traditional bicycle handlebar and stem and required a complex and expensive moulded design of a special handlebar to accommodate the light pipe form and this design was not suitable for applications to be mounted on to conventional bicycle handlebars.

The present invention provides a unique and distinctive light pipe design mountable to a bicycle handlebar and stem. The light is preferably dimensioned so that it can be positioned between the brake levers and extending in line with the handlebar. Most bicycle handlebars are formed from metal, and are connected to the front steering fork of the bicycle by a "stem." The stem is generally made from metal or carbon fibre and has a clamp arrangement at either end allowing the stem to connect the handlebar rigidly to the bicycle front fork steerer tube by the clamping arrangement. The stem generally extends forwardly and upwardly from the upper end of the steerer tube, with the handlebar mounted across the forward end of the stem. The form of the handlebar and stem connection is roughly and generally a "T" junction. On the handlebar a pair of brake levers is fitted, one either side of the stem. The handlebar also has mounted to it gear shift controls, and grips at the ends for the rider to hold. Most bicycles have a space on the handlebar between the brake levers that lends itself to fitting of a light pipe according to the present invention.

In one aspect, the invention provides a forward facing bicycle light pipe assembly mountable horizontally and in line with the handlebar. This light pipe assembly preferably includes two LEDs with attached heat sink elements made of metal or other suitable heat conductive material, mounted at respective ends of the generally round-section light pipe. It is however foreseen that a single LED may be used, mounted at one end of the light pipe. The light pipe assembly may include an opaque rear part and a generally transparent forward part surrounding the light pipe. The interior of the rear part may be painted or coated in a light colour such as white and may surround the rear-facing portion of the light pipe.

The purpose of the clear and transparent forward facing shield is to allow light to pass through but to prevent dust, water and debris from entering the light pipe assembly. The purpose of the generally white and opaque background is to create a uniform intensity of light when the light pipe is viewed from the front with the light on or off.

The light pipe assembly is preferably enclosed within a housing which surrounds the central part of the handlebar, and which includes an opening through which the stem may extend out of the housing. The housing may further comprise a clear and transparent forward facing shield through which light reflected and refocused forward by focus features of the light pipe can pass. An opaque light pipe cover peak assembly is preferably provided to extend forwardly from the housing above the light pipe assembly to prevent light from the light pipe being seen by the rider.

The light pipe assembly is held central and longitudinally in line with the handlebar by upper and lower cover parts of the housing which enclose at least an end of the stem adjacent the handlebar, and a portion of the handlebar between the brake levers. The lower cover has a generally "T" section so as to be able to be fitted to a standard bicycle stem and handlebar connection and the upper cover is generally a mating half of the lower cover so that, when the upper and lower covers are fitted they form a housing which encloses at least the end of the stem and the part of the handlebar between the brake levers. The upper and lower covers may be moulded from plastics material and may be fixed together by fixings such as screws or bolts. When fitted, said screws hold the upper and lower covers securely around the handlebar, and form a clamping arrangement that fixes the light pipe assembly securely within the covers. The light pipe assembly includes, for each LED, a respective heat sink for conducting heat away from the LED. When the light pipe assembly is mounted to the bicycle, the heat sinks of the LEDs are held in contact with the handlebar, which is usually formed from metal, so that heat can be conducted away from the heat sinks by the metal handlebar.

The upper and lower covers preferably have at each end a generally round section adapted to fit the handlebar so that when clamped together, the covers are located appropriately and concentrically around the handlebar. A resilient ring may be provided to surround the handlebar at the end of the covers, as an aid to reducing vibration. Space is provided within the housing defined by the upper and lower covers to house an LED driver printed circuit board (pcb) that is used to control the LEDs of the light pipe.

A preferred embodiment of the invention will now be described with reference to the accompanying drawings in which.

Figure 1:
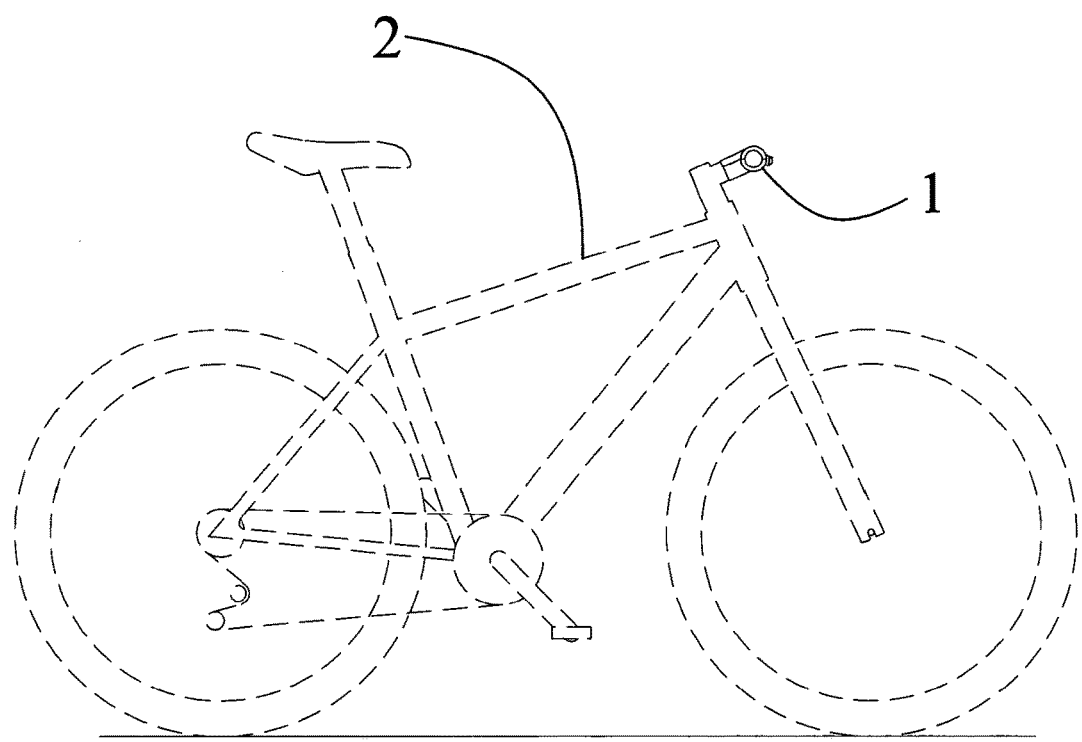
FIG. 1 is a side view of a conventional bicycle showing the mounting position of the bicycle light.

Referring now to the drawings, FIG. 1 illustrates the mounting position of a handlebar light 1 mounted to a bicycle 2. In this embodiment, the handlebar is supported by a stem which extends upwardly and forwardly from the upper end of the steering tube of the bicycle.

Figure 2:
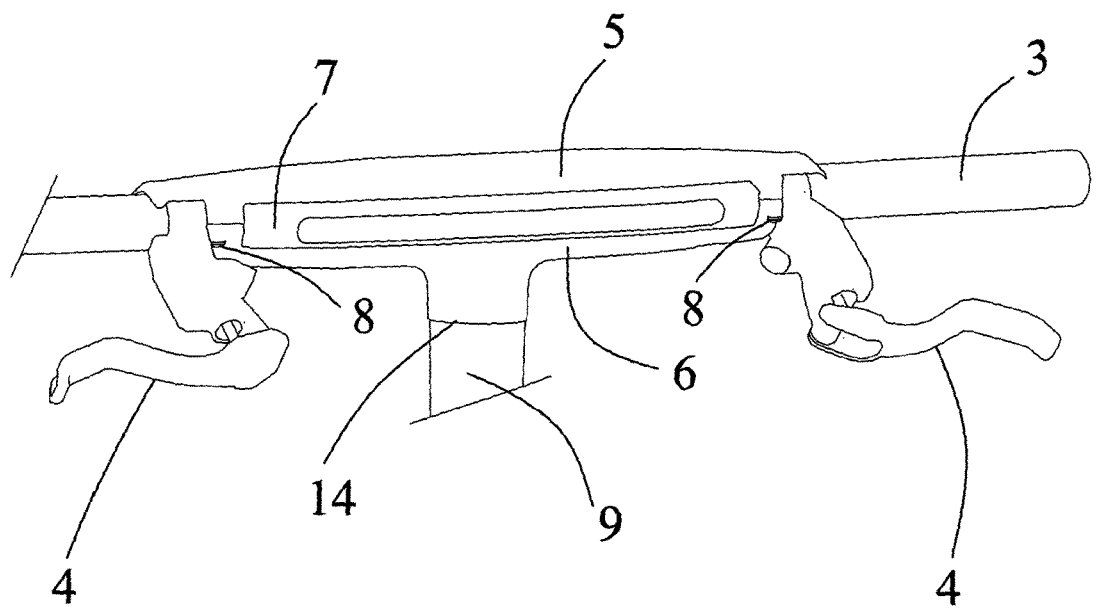
FIG. 2 is a perspective view of a bicycle light of the invention seen from the front and one side, showing the light pipe assembly and the housing mounted to a handlebar of a bicycle.

FIG. 2 shows a bicycle light incorporating a light pipe according to the invention in more detail mounted to a handlebar 3 and positioned between brake levers 4. In the embodiment shown in FIG. 2, the handlebar 3 is supported by a stem 9 extending substantially vertically as an extension of the steering tube of the bicycle.

The bicycle light comprises a housing formed by an upper cover 5 and a lower cover 6 which are preferably made from injection moulded plastics material. The covers 5 and 6 are a clam shell type arrangement able to receive a central part of the handlebar 3 and rigidly retain a light pipe assembly 7. The covers 5 and 6 are preferably held together with cover screws 8 which pass through openings in one of the covers and engage in the material of the other cover. Cover screws 8 may be of the self-tapping variety. Lower cover 6 is formed with an aperture 14 through which the bicycle handlebar stem 9 extends downwardly.

Figure 3:
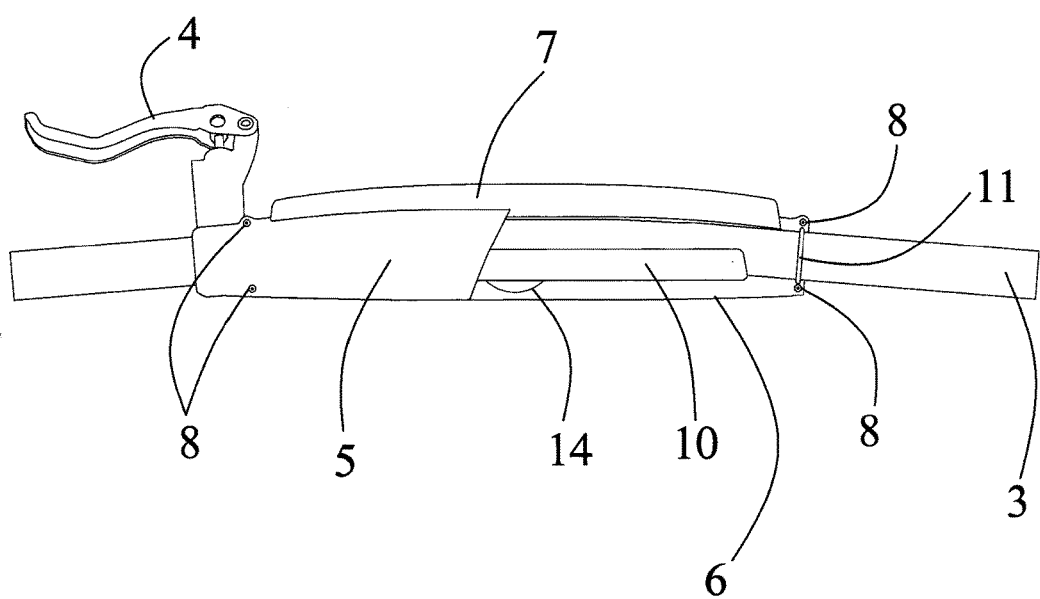
FIG. 3 is a cutaway view from above of the light pipe and housing of FIG. 2.

FIG. 3 shows a cut away view from above of the bicycle lamp fitted to handlebar 3 and positioned between brake levers 4. The bicycle lamp comprises an upper cover 5 and a lower cover 6. A printed circuit LED driver board 10, which is well known in the art, is positioned within the housing formed by the covers 5 and 6, and above the handlebar 3. The function of LED driver board 10 is to electronically control the light pipe assembly 7 mounted within the covers 5 and 6 and in front of the handlebar 3. Upper cover 5 and lower cover 6 are formed with a respective internal groove at their ends, such that when the covers 5 and 6 are clamped together the internal grooves can receive an o-ring 11 which acts as a seal against moisture and debris entering the cover, and provides a compliant interface engaging with handlebar 3.

Figure 4:
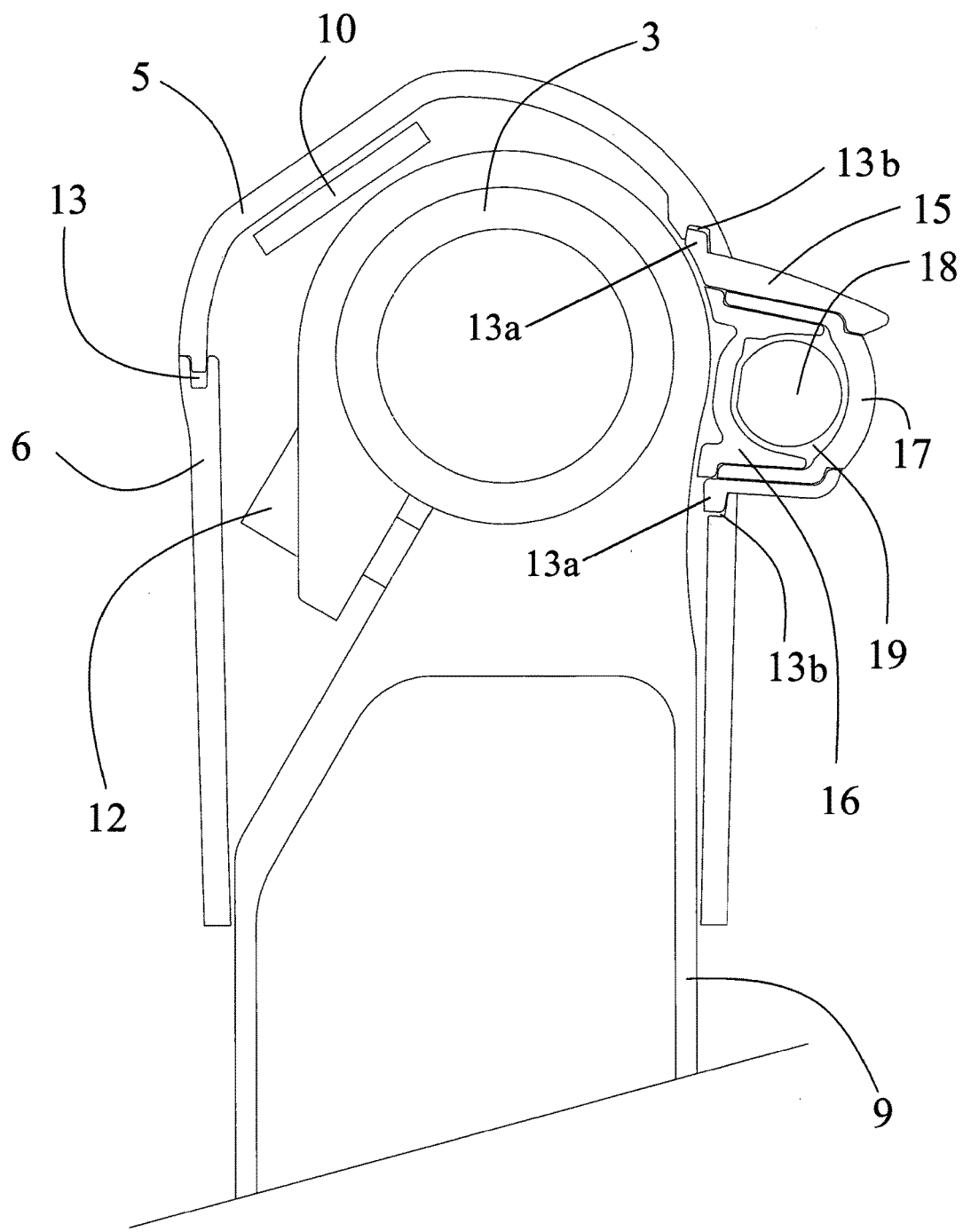
FIG. 4 is a sectional view of a handlebar and handlebar stem showing the housing and light pipe mounted thereto.

FIG. 4 shows a vertical section through the bicycle handlebar 3 and stem 9 of FIGS. 2 and 3. The stem 9 is formed at its upper end with a clamp which may be tightened around handlebar 3 by means of a stem screw 12. LED driver board 10 is shown positioned between upper cover 5 and handlebar 3. LED driver board 10 is preferably encapsulated in a protective material and may be retained to the upper cover 5 by the encapsulating material or by an adhesive, such as silicone or other suitable adhesive.

The light pipe assembly comprises the generally rod-like light pipe 18, a backing piece 16 of generally channel-section into which the light pipe 18 is received, and a transparent shield 17 which fits over the backing piece 16 so that the light pipe 18 is entirely surrounded. The backing piece 16 is generally opaque and preferably light in colour, while the transparent shield 17 is clear and may the shaped has a lens at its forward part 14. The backing piece 16 may have outwardly-projecting flanges to engage the free edges of the transparent shield 17 for locating the two parts together. The transparent shield 17 includes a pair of forwardly-facing shoulders immediately above and below the light-emitting portion of the shield 17. The light pipe assembly further comprises a cover peak 15 which engages the transparent shield 17 at the shoulders, and which includes outwardly-facing tongues 13a at its rearward edges. Which engage the upper and lower cover parts at rebates 13.

Upper cover 5 and lower cover 6 are formed with light pipe retention channels 13b which extend along the forward edges of the upper and lower covers 5 and 6, respectively. Light pipe retention channels 13b are made to receive respective tongues 13a of the light pipe cover peak 15. Backing piece 16, transparent shield 17 and cover peak 15 may be fixed together by any suitable joining technique, such as ultrasonic welding, adhesive bonding or the like. The light pipe 18 is enclosed within opaque backing piece 16 and transparent shield 17 such that there exists an air gap 19 between the light pipe 18 and the opaque backing piece 16 and transparent shield 17.

Figure 5:
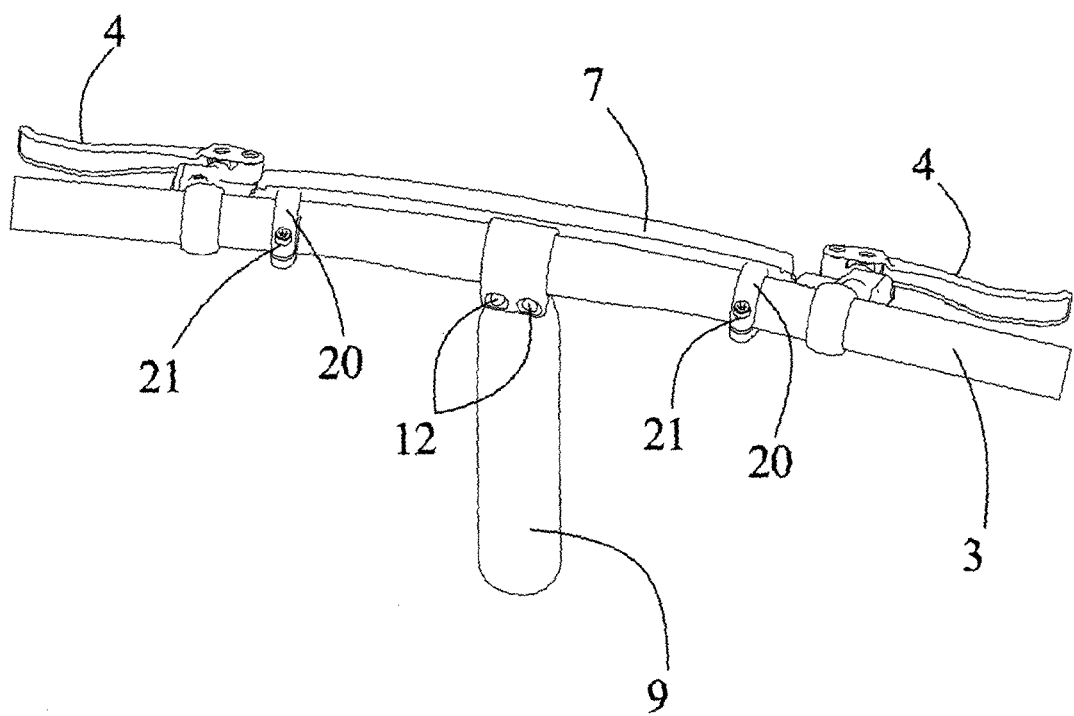
FIG. 5 is a perspective view showing an alternative mounting arrangement of the light pipe assembly to a handlebar.

FIG. 5 is a perspective view showing an alternative mounting arrangement of the invention. In this embodiment, the bicycle light is mounted generally in front of the handlebar, with no housing surrounding the handlebar 3. Handlebar clamps 20 and clamp screws 21 are used to mount light pipe assembly 7 to handlebar 3. Handlebar 3 is shown with brake levers 4 fitted and handlebar 3 is mounted to handlebar stem 9 with stem screws 12. Handlebar clamps 20 and with clamp screws 21 allow for light pipe assembly 7 to be adjustable in angle with respect to handlebar 3 and generally adaptable to a wide range of well-known bicycle handlebar variations. Handlebar clamps 20 are preferred to be made of the plastic moulded variety and could be integral with light pipe assembly 7. In this embodiment, the light pipe assembly 7 is arranged such that the light pipe is enclosed within a protective housing, and the heat sinks of the LEDs are exposed at the rear of the housing so that when the clamps 20 are engaged, the heat sinks are brought into contact with the handlebar 3 so that heat can be conducted away through the handlebar material.

Figure 6:
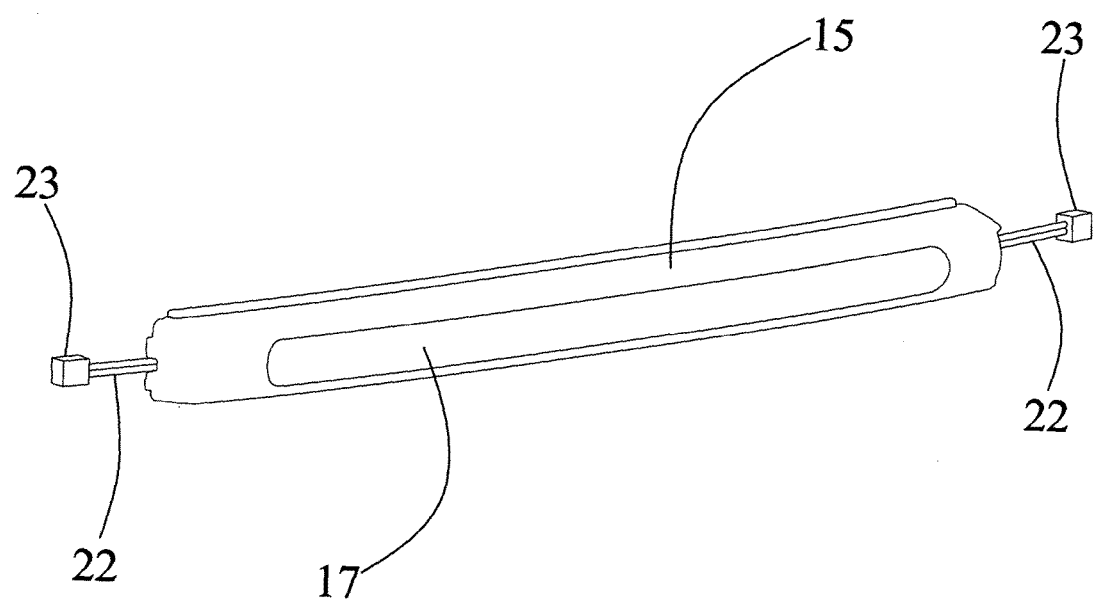
FIG. 6 is a front perspective view showing the various parts of the light pipe assembly.

FIG. 6 is a front perspective view showing the various parts of the light pipe assembly. Light pipe cover peak 15 has a frontal opening through which the transparent shield 17 is exposed. Extending outboard from light pipe cover peak 15 are LED wires 22 connected to LED wire connectors 23. LED wires 22 and LED wire connectors 23 are of well-known variety and are made to interface with mating connector is attached to the LED driver board 10 for the purpose of transmitting electrical power and control signals from the LED driver board 10 to the LEDs.

Figure 7:
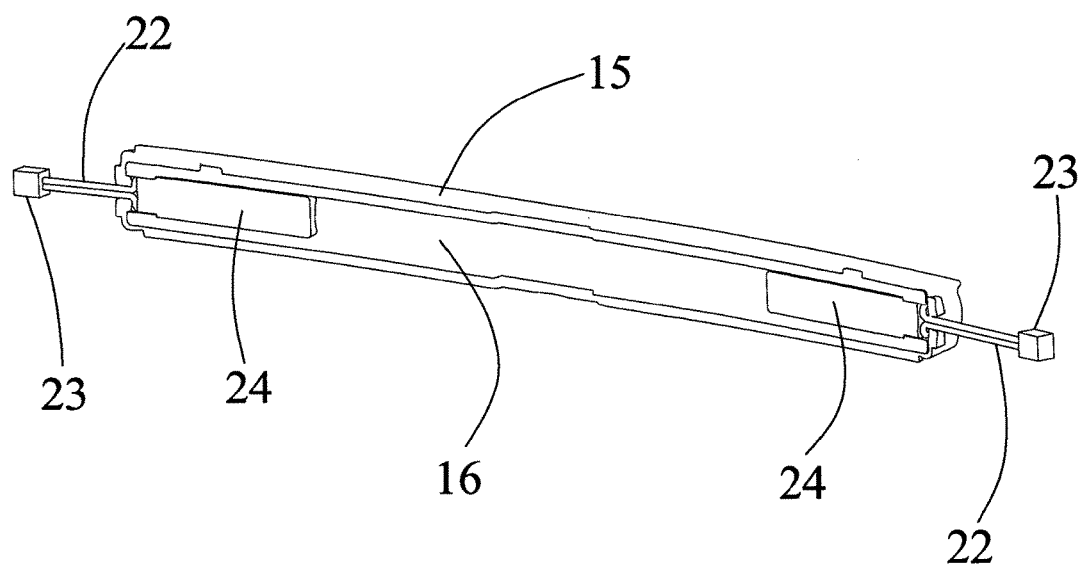
FIG. 7 is a rear perspective view showing the various parts of the light pipe assembly of FIG. 6.

FIG. 7 is a rear perspective view of the light pipe assembly of FIG. 6. Opaque backing piece 16 is shown connected to light pipe cover peak 15. Extending outboard from light pipe cover peak 15 are LED wires 22 connected to LED wire connectors 23. Also shown in FIG. 7 are LED heat sinks 24 which are preferably of metal such as aluminium or other suitable material able to effectively absorb heat from the LEDs of the light pipe assembly. The form and positioning of the LED heat sinks 24 is such that when the bicycle light is fitted to a bicycle handlebar, heat can transfer from LED heat sinks 24 into said bicycle handlebar by conduction.

Figure 8:
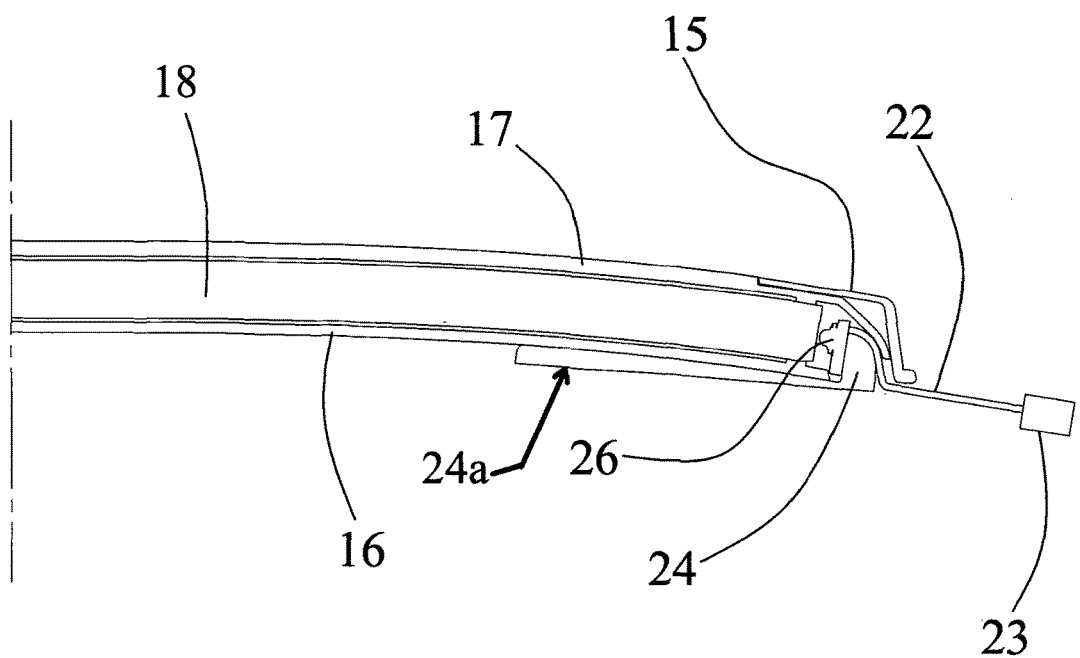
FIG. 8 is a horizontal cross section seen from above of the light pipe assembly of FIG. 6.

FIG. 8 is a horizontal cross section seen from above, showing the various parts of the light pipe assembly. Light pipe cover peak 15 is shown surrounding the transparent shield 17. Opaque backing piece 16 is shown connected to light pipe cover peak 15 such that light pipe 18 is encapsulated within. At opposing ends of light pipe 18 are LED pcb assemblies 26 connected to LED wires 22 and connected to LED wire connectors 23. LED pcb assemblies 26 are of the well-known variety readily available and positioned such that light emitted from LED pcb assemblies 26 is directed substantially into the ends of light pipe 18. LED pcb assemblies 26 are shown mounted to LED heat sinks 24. The means for mounting can be by thermally conductive glue or other well-known heat transfer adhesive such that heat from LED pcb assemblies 26 is transferred into LED heat sinks 24 such that LED pcb assemblies 26 are able to operate without overheating. The heat sinks 24 are provided with a contact surface 24a which, when the light pipe assembly is mounted to the bicycle handlebar, is in contact with the bicycle handlebar so that heat may pass by conduction out of the heat sink 24 and into the handlebar material.

Figure 9:
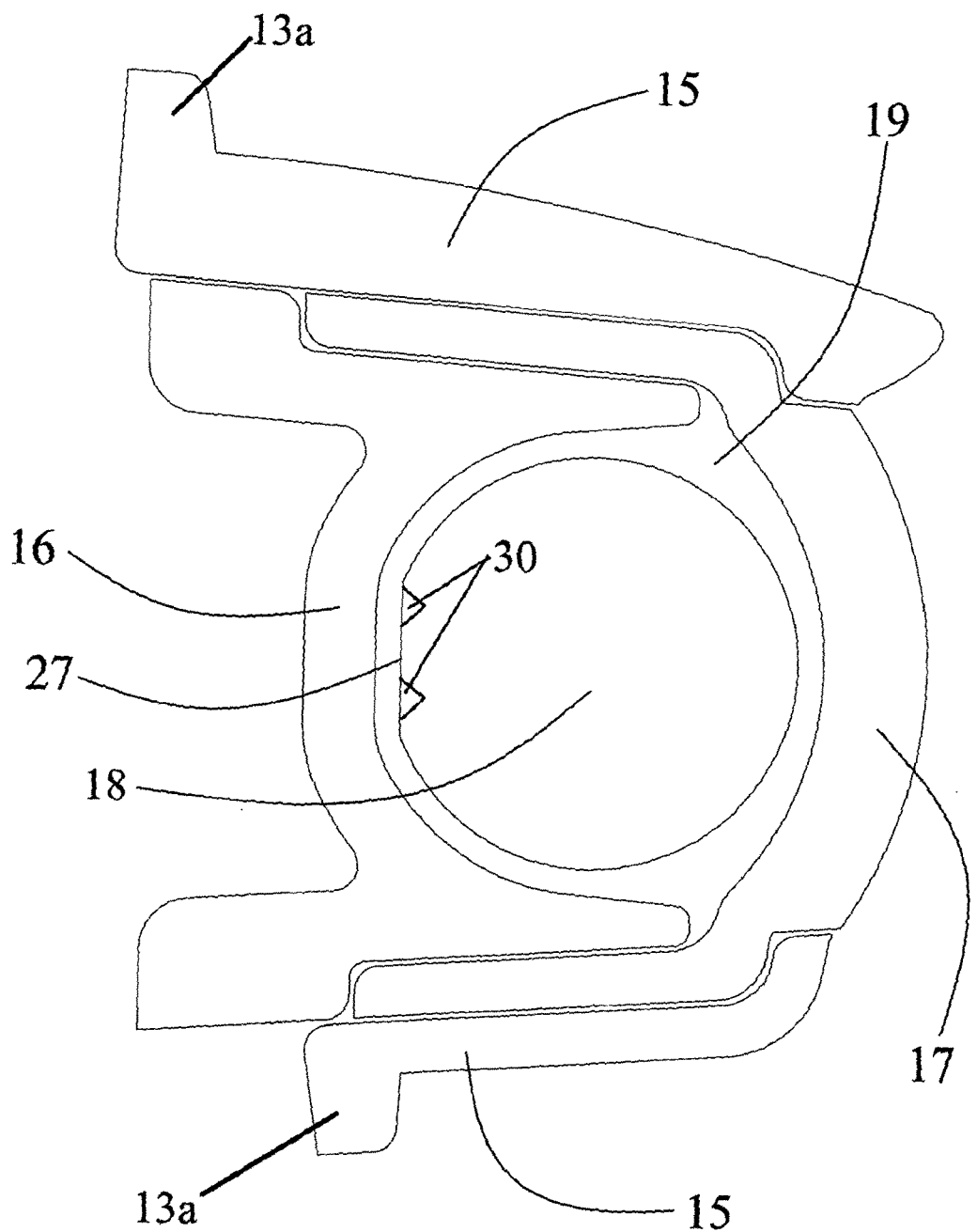
FIG. 9 is a vertical cross section to an enlarged scale of the light pipe assembly of FIG. 6.

FIG. 9 is a side view of a vertical cross section showing the various parts of the light pipe assembly. Light pipe cover peak 15 is shown with its outwardly-protruding upper and lower tongues 13a. The transparent shield 17 is received within cover peak 15, and opaque backing piece 16 is in turn received within transparent shield 17 so as to enclose light pipe 18. The opaque backing piece 16, light pipe cover peak 15 and transparent shield 17 may be joined with glue or by any suitable plastics joining method such as ultrasonic welding. Light pipe 18 is held in place by connection to opaque backing piece 16 substantially outboard and towards opposing ends of light pipe 18 such that an air gap 19 exists substantially around light pipe 18. Air gap 19 is preferably on the order of from 0.2 to 1 mm and exists to assist with providing a uniform appearance of light intensity.

Light pipe 18 has a generally round cross section and is formed with a flattened reflective face 27. Reflective face 27 is formed such that light travelling within light pipe 18 is reflected away from reflected face 27 and is emitted through transparent shield 17. Along the reflective face 27 of the light pipe 18, focus and reflecting elements consisting of a series of angled facets 30 extending into the light pipe 18 are formed in the surface 27 of the light pipe 18. Light from the LED sources travels immediately into the light pipe 18 at the ends and remains "trapped" in the light pipe as it is reflected internally off the smooth polished surface of the pipe due to the shallow angle of incidence of the light on the internal surface of the light pipe. At the point that light interacts with the focal and reflecting element portion 30 of the light pipe, the light is reflected away from the face 27 and out of the light pipe through the transparent shield 17.

The invention claimed is:

1. A bicycle light for mounting to a bicycle handlebar, comprising:
    an elongate light pipe (18);
    mounting means (20, 21) for mounting the light pipe generally parallel to the bicycle handlebar, with a reflective rear face (27) of the light pipe adjacent to the handlebar so that light reflected from the reflective rear face exits the light pipe in a direction away from the handlebar;
    an LED (26) mounted to emit light into an end of the light pipe (18); and
    a heat sink (24) in thermal contact with the LED (26) and arranged such that, when the bicycle light is mounted to a bicycle handlebar by the mounting means (20, 21), the heat sink (24) is in thermal contact with the handlebar and can transfer heat from the LED into the bicycle handlebar by conduction.

2. A bicycle light according to claim 1, comprising:
    two LEDs (26) mounted to emit light into respective ends of the light pipe (25); and
    two heat sinks (24) each in thermal contact with a respective LED (26).

3. A bicycle light according to claim 1, further comprising a housing (5, 6) adapted to surround the light pipe and at least a portion of the handlebar, the housing comprising a transparent shield (17) through which light emitted by the light pipe may pass.

4. A bicycle light according to claim 3, wherein the housing is adapted to surround the entire length of the light pipe and a corresponding length of the handlebar.

5. A bicycle light according to claim 3, wherein the housing further comprises an opaque cover peak (15) extending forwardly above the transparent shield, such that light emitted by the bicycle light when mounted on a bicycle is not seen by a rider of the bicycle.

6. A bicycle light according to claim 1, wherein the reflective rear face (27) of the light pipe comprises focus and reflecting elements for directing light out of the light pipe.

7. A bicycle light according to claim 6, wherein the focus and reflecting elements comprise a series of angled facets protruding into the light pipe.

8. A bicycle light according to claim 1, in which the light pipe is a generally round and solid clear plastics component.

9. A bicycle including a handlebar, and having mounted thereto a bicycle light according to claim 1.

* * * * *